(12) United States Patent
Kusaka et al.

(10) Patent No.: US 7,499,538 B2
(45) Date of Patent: Mar. 3, 2009

(54) TELEPHONE FOR SEARCHING MEMORY CONTENT USING A SIMPLE USER OPERATION

(75) Inventors: Hiroyuki Kusaka, Takatsuki (JP); Mitsuji Hama, Higashiosaka (JP); Masahiro Naito, Kashihara (JP); Eiji Kotobuki, Toyonaka (JP)

(73) Assignee: Sanyo Electric Co., Ltd., Osaka-Fu (JP)

( * ) Notice: Subject to any disclaimer, the term of this patent is extended or adjusted under 35 U.S.C. 154(b) by 599 days.

(21) Appl. No.: 11/325,417

(22) Filed: Jan. 5, 2006

(65) Prior Publication Data

US 2006/0171525 A1    Aug. 3, 2006

Related U.S. Application Data

(62) Division of application No. 09/530,970, filed as application No. PCT/JP98/05363 on Nov. 30, 1998, now Pat. No. 7,092,511.

(30) Foreign Application Priority Data

Dec. 1, 1997   (JP)  .................................. 9-330609
Apr. 17, 1998  (JP)  ................................ 10-107623

(51) Int. Cl.
*H04M 3/00*  (2006.01)
(52) U.S. Cl. .................................. 379/355.09; 379/354
(58) Field of Classification Search ............ 379/355.09, 379/355.02, 354; 455/566, 550.1, 564
See application file for complete search history.

(56) References Cited

U.S. PATENT DOCUMENTS

| | | | |
|---|---|---|---|
| 4,475,013 A | 10/1984 | Lee et al. | |
| 4,800,582 A | 1/1989 | D'Agosto, III et al. | |
| 4,885,771 A | 12/1989 | Rabideau et al. | |
| 5,491,745 A | 2/1996 | Roeder | |
| 5,509,067 A | 4/1996 | Murata | |
| 5,583,921 A | 12/1996 | Hidaka | |
| 5,754,602 A | 5/1998 | Landry et al. | |
| 5,930,352 A | 7/1999 | Hiraiwa | |
| 5,982,876 A | 11/1999 | Albesa | |
| 5,991,396 A | 11/1999 | Salm et al. | |
| 6,055,439 A | 4/2000 | Helin et al. | |
| 6,125,287 A | 9/2000 | Cushman et al. | |

(Continued)

FOREIGN PATENT DOCUMENTS

EP    0 567 333 A1    10/1993

(Continued)

*Primary Examiner*—Curtis Kuntz
*Assistant Examiner*—Phylesha Dabney
(74) *Attorney, Agent, or Firm*—Arent Fox LLP

(57) ABSTRACT

A telephone enabling a user to search a telephone directory using a simple and trouble-free operation.

The telephone has a storage unit for storing names to be called and corresponding telephone numbers, and an operating unit including a plurality of numeric keys that are each assigned different characters. The telephone also includes a control unit. When a key press of at least the predetermined time is received by the operating unit, the control unit searches the storage unit for names that include a character assigned to the pressed numeric key, and displays the found names on a display unit. The user can switch the telephone to telephone directory mode and perform a keyword search simply by pressing a numeric key for at least the predetermined time.

1 Claim, 15 Drawing Sheets

U.S. PATENT DOCUMENTS 7,092,511 B1 * 8/2006 Kusaka et al. .......... 379/355.09

FOREIGN PATENT DOCUMENTS

| | | |
|---|---|---|
| EP | 0 726 657 A1 | 8/1996 |
| GB | 2 278 756 A | 12/1994 |
| JP | 5-130665 | 5/1993 |
| JP | 5-183619 | 7/1993 |
| JP | 7-131512 | 5/1995 |
| JP | 07-162498 A | 6/1995 |
| JP | 8-65375 | 3/1996 |
| JP | 9-36946 | 2/1997 |
| JP | 9-275411 | 10/1997 |
| JP | 9-275441 A | 10/1997 |
| WO | 96/27947 | 9/1996 |

* cited by examiner

Fig. 2

| REGISTRATION NO. | NAME | TELEPHONE NO. | GROUP NO. |
|---|---|---|---|
| 001 | カワヅラ (KAWAZURA) | 222-222-2222 | 2 |
| 002 | BRODY | 555-555-5555 | 3 |
| 003 | アイダ (AIDA) | 123-456-7890 | 2 |
| 004 | イソカネ (ISOKANE) | 098-765-4321 | 1 |
| 005 | BD | 567-890-1234 | 3 |
| 006 | キクコ (KIKUKO) | 999-999-9999 | 2 |
| 007 | ABC LTD | 666-666-6666 | 3 |
| 008 | シミズ (SIMIZU) | 123-123-1231 | 3 |
| 009 | イガラシ (IGARASI) | 234-567-8901 | 3 |
| 010 | ウエダ (UEDA) | 333-333-3333 | 1 |
| 011 | イトウ (ITO) | 121-121-1234 | 1 |
| 012 | AD | 111-222-3333 | 3 |
| 013 | EDA | 456-789-0123 | 3 |
| 014 | ササキ (SASAKI) | 111-111-1111 | 3 |
| 015 | ナカジマ (NAKAJIMA) | 525-535-5555 | 1 |
| ... | ... | ... | ... |

(KIKUKO) (KAWAZURA)

| RECORD NO. | REGISTRATION NO. | NAME | TELEPHONE NO. | GROUP NO. |
|---|---|---|---|---|
| 001 | 001 | カワヅラ | 222-222-2222 | 2 |
| 002 | 002 | BRODY | 555-555-5555 | 3 |
| 003 | 005 | BD | 567-890-1234 | 3 |
| 004 | 006 | キクコ | 999-999-9999 | 2 |
| 005 | 007 | ABC LTD | 666-666-6666 | 3 |
| 006 | 012 | AD | 111-222-3333 | 3 |

(b)

(KIKUKO) (KAWAZURA)

| RECORD NO. | REGISTRATION NO. | NAME | TELEPHONE NO. | GROUP NO. |
|---|---|---|---|---|
| 001 | 001 | カワヅラ | 222-222-2222 | 2 |
| 002 | 006 | キクコ | 999-999-9999 | 2 |
| 003 | 007 | ABC LTD | 666-666-6666 | 3 |
| 004 | 012 | AD | 111-222-3333 | 3 |
| 005 | 005 | BD | 567-890-1234 | 3 |
| 006 | 002 | BRODY | 555-555-5555 | 3 |

(c)

(ITO) (UEDA) (ISOKANE)

| RECORD NO. | REGISTRA-TION NO. | NAME | TELEPHONE NO. | GROUP NO. |
|---|---|---|---|---|
| 001 | 004 | イソカネ | 098-765-4321 | 1 |
| 002 | 010 | ウエダ | 333-333-3333 | 1 |
| 003 | 011 | イトウ | 121-121-1234 | 1 |
| 004 | 015 | ナカジマ | 525-535-5555 | 1 |

(NAKAJIMA)

(a)

| RECORD NO. | NAME | TELEPHONE NO. | GROUP NO. |
|---|---|---|---|
| 001 | AAA | 111-111-1111 | 2 |
| 002 | BBB | 222-222-2222 | 1 |
| 003 | CCC | 333-333-3333 | 1 |
| 004 | DDD | 444-444-4444 | 2 |
| 005 | EEE | 555-555-5555 | 3 |
| 006 | FFF | 666-666-6666 | 2 |

(b)

② ↓SHORT PRESS OF '∇'  ↑SHORT PRESS OF 'Δ'

③ ↓SHORT PRESS OF '∇'  ↑SHORT PRESS OF 'Δ'

(c)

⑤ ↓LONG PRESS OF '∇'↑    LONG PRESS OF '∇' ⑦

TELEPHONE FOR SEARCHING MEMORY CONTENT USING A SIMPLE USER OPERATION

CROSS-REFERENCE TO RELATED APPLICATION

This is a divisional application which claims the benefit of U.S. patent application Ser. No. 09/530,970, filed May 19, 2000, now U.S. Pat. No. 7,092,511 which is a 371 Application of International Application No. PCT/JP98/05363, filed Nov. 30, 1998. The disclosures of the prior applications are hereby incorporated herein in their entirety by reference.

INDUSTRIAL FIELD OF USE

The present invention relates to a telephone having a memory storing telephone book data, and in particular to an improvement in an operation for searching memory content.

RELATED ART

A wide variety of features have been developed for use in modern telephones. One feature present in the majority of current models is the telephone book (hereafter phone book).

Telephones with a phone book have an internal rewritable memory storing data such as names (of individuals or companies) and associated telephone numbers. Data for parties frequently called by the user may be entered in the memory. After the data is entered, the user can display it on a display screen and make a call by performing certain operations.

The following explains the procedure for such operations. One simple method involves the user pressing a phone book key (or, in, certain telephones, a call key). This causes one part of the data stored in the memory, for example the name and telephone number for one entry in the phone book, to be displayed. If the user presses a next screen key or a previous screen key data for another entry is displayed, so that the user can display a desired piece of data by repeatedly pressing the next screen or previous screen keys. When the screen keys are repeatedly pressed in this manner, pieces of data can be displayed in order, for example in alphabetical order for the Japanese syllabic alphabet (an alphabet having fifty characters, also referred to as kana) and for the Roman alphabet.

The above procedure is useful when there are few recorded entries, but when there are many recorded entries, it takes a long time to display the desired data. Data for hundreds of entries can be recorded in modern telephones, so this is a significant problem.

As a result, some conventional telephones have adopted a specific search function. The operating procedure for this function starts with the user pressing the phone book key, thereby putting the telephone into phone book search mode. A prompt, such as 'Name?' is displayed on the screen. Next, the user inputs the initial character of the name they want to display using one of the numeric keys, the telephone memory is searched for corresponding pieces of data, and one entry from the search result is displayed. To input an initial character, the user needs to press one of the numeric keys at least once (the letter B for example, is obtained by pressing the '2' key twice). Following this, the user can display the desired data from amongst the specific data by pressing the next screen and previous screen keys.

The specific search function enables specific data to be displayed, so this function is useful when a large quantity of data is recorded.

However, a phone book that uses a conventional specific search does not operate very effectively. This is because the user needs to perform the operation for switching to phone book mode, followed by the operation for inputting a key (initial character or characters) for the specific search. Here, the operation for switching to phone book mode is performed by pressing the phone book key, or by calling up a menu, and selecting the phone book mode from the menu. Once the telephone has been switched to phone book mode, input of a key for making the search more specific is performed by pressing one or more numeric keys a plurality of times.

In addition to it being difficult for the user to remember the procedure for performing these operations, it takes a long time to obtain the desired search result.

The object of an invention that overcomes the above problems is to provide a telephone that performs a high-speed search of a memory storing phone book data, using a simple operation that causes the user no difficulties.

DISCLOSURE OF THE INVENTION

In order to achieve the above object, the telephone of the present invention may include the following. A storage unit stores names to be called and corresponding telephone numbers. An operating unit that includes a plurality of numeric keys that are each assigned different characters, receives key operations made by a user. A searching unit searches the storage unit, when a numeric key on the operating unit is pressed for at least a predetermined time, for names that include a character assigned to the pressed numeric key. A display means displays a search result.

By using this construction when searching the phone book, a user is able to perform a search and display a search result simply by pressing a key for at least a specified time; in other words by performing a long key press of the numeric key to which the character that is the search object is assigned. Therefore, the user can actually perform both an operation for switching to phone book mode and an operation for indicating characters for making an indexed search simply by making one long key press. This means that phone book searches can be executed extremely easily, thereby reducing the user operation time, and enabling searches to be performed more quickly.

Furthermore, the searching unit may hold the search result in the form of a list of names found in the search, and the display means updates a display with at least one name from the name list that is not currently displayed, when the operating unit receives a display updating operation.

If the number of names in the search result is greater than the number of names that can be displayed by the display means, the above construction enables the user to scroll the display for sequential reference by using a display updating operation.

Furthermore, the operating unit may have a display update key for updating the display of the search result; and the display updating operation is a press of the display update key.

In this construction, the display of the search result is scrolled by pressing a display update key.

The storage unit further stores group classifications corresponding to the names. Each group classification is assigned to one of the numeric keys, and when the operating unit receives a second key press of the same key for at least the predetermined time, the searching unit finds names having a group classification assigned to the pressed numeric key.

In this construction, when names and telephone numbers are stored in the storage unit in groups, the user can perform a group search simply by a second press of one numeric key that indicates a specific group.

The operating unit further has up and down keys, and the display updating operation may be a press of one of the up and down keys for at least the predetermined time. The display unit updates the display by (1) displaying names from the name list that follow the currently displayed names, when the down key is pressed for at least the predetermined time, and (2) displaying names from the name list that precede the currently displayed names, when the up key is pressed for at least the predetermined time.

This construction enables a desired search object to be displayed by sequentially pressing a combination of the up key and the down key to scroll the displayed search result.

The display updating operation may be a second press of a numeric key for at least the predetermined time.

In this construction, the displayed search result is scrolled by pressing a same numeric key that previously received a long press. When using a mobile phone, the user can display a desired search object simply by pressing a numeric key for the required number of times, without needing to move either the phone itself or the finger pressing the numeric key.

The display unit may further display a predetermined number of names from the names found by the searching means, one of the displayed names being in a selection state. The name in the selection state is displayed differently to other names. When a selection changing operation is received by the operating unit, the display unit places another name that is currently being displayed into the selection state.

This construction enables the user to move the selection state from the currently selected name to another name.

The operating unit may further have a select key for moving the selection state, and the selection changing operation is a press of the select key.

In this construction, the selection state is moved by pressing a select key.

The operating unit has up-and down keys, and the selection changing operation may be a press of one of the up and down keys lasting for less than the predetermined time. The display unit places in the selection state (1) a name displayed following a name currently in the selection state, when the down key is pressed for less than the predetermined time, and (2) a name displayed preceding a name currently in the selection state, when the up key is pressed for less than the predetermined time.

In this construction, a desired search object can be placed into the selection state by sequentially pressing a combination of the up and down keys.

The selection changing operation may be a second press of the same numeric key that was previously pressed for at least the predetermined time.

This construction enables the selection state to be moved each time a key that previously received a long press is pressed. Therefore, the user can actually perform operations for switching to phone book mode and for indicating characters for an indexed search, and then move the selection state, simply by one long key press followed by a repeated operation of the same key. This means that phone book searches can be executed very easily and speedily. This is especially relevant when the user is operating a mobile phone. Here, once a numeric key has been pressed, the operations from the start of a search for a desired search object to placing an object in the selection state can be performed in one continuous operating sequence, without it being necessary to change the position of the phone or the finger used to press the numeric key.

The telephone may also include a calling unit for reading from the storage unit, when a call operation is received from the operating means, a telephone number corresponding to a name on the display unit currently in the selection state, and calling the telephone number.

This construction enables the telephone to call a telephone number for a name displayed as part of the search result. As a result, a user can use the phone book to make calls in a short time and using a simple operation.

The call operation may be a repeated press, for a predetermined number of times within a predetermined period, of the same numeric key that was previously pressed for at least the predetermined time.

This construction enables the user to call the telephone number of a desired search object by performing a so-called double click operation on a same numeric key that previously received a long key press. This is especially relevant when the user is operating a mobile phone. Here, once a numeric key has been pressed, the operations from the start of a search for a desired search object to placing an object in the selection state can be performed in one continuous operating sequence, without it being necessary to change the position of the phone or the finger used to press the numeric key.

BRIEF DESCRIPTION OF DRAWINGS

FIG. 2 shows an example of a phone book table stored in a storage unit;

FIG. 5 shows examples of storage content for a working memory;

BEST MODE FOR CARRYING OUT THE INVENTION

First Embodiment

Construction of Mobile Telephone

Figure 1:
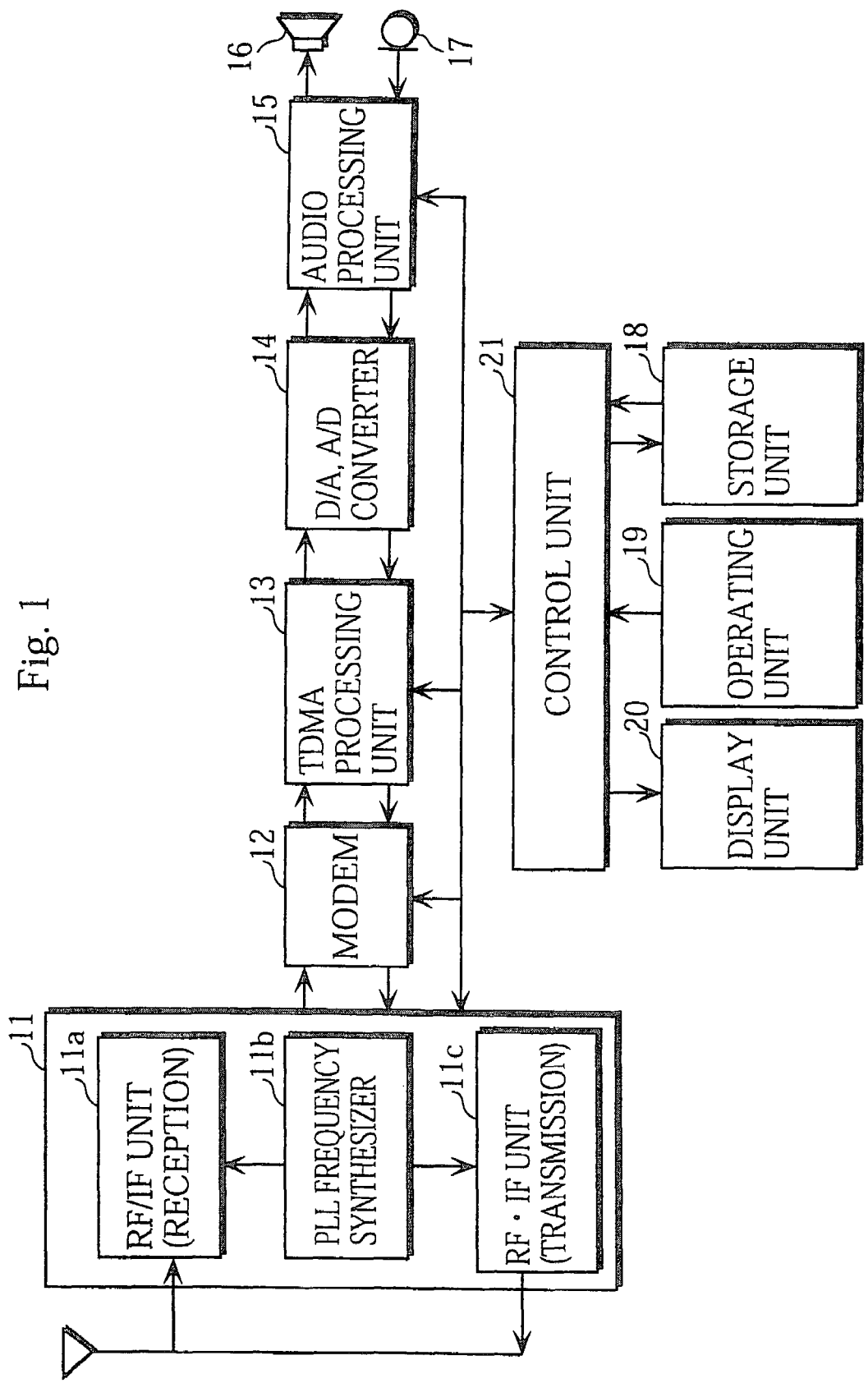
FIG. 1 is a block diagram showing a construction of a telephone in a first embodiment of the invention.

FIG. 1 is a block diagram showing an example construction for a mobile telephone in a first embodiment of the invention.

The telephone in the drawing includes a radio unit 11, a modem 12, a TDMA (Time Division Multiple Access) processing unit 13, a D/A, A/D converter 14, an audio processing unit 15, a speaker 16, a microphone 17, a storage unit 18, an operating unit 19, a display unit 20 and a control unit 21.

The radio unit 11 has a PLL (Phase Locked Loop) frequency synthesizer 11b, and RF/IF (Radio Frequency/Intermediate Frequency) units 11a and 11c. The PLL frequency synthesizer 11b generates a local oscillation frequency signal determining the carrier wave frequency for transmission. On receiving a high frequency signal from an antenna, the RF/IF unit 11a changes this high-frequency signal to a baseband signal via an intermediate frequency. On performing transmission, the RF/IF unit 11c changes a baseband signal to a high-frequency signal.

The modem 12 performs modulation and demodulation between the radio unit 1 and the TDMA processing unit 13 using, for example, $\pi/4$ shift QPSK (Quadrature Phase Shift Keying)

The TDMA processing unit 13 performs time-division multiplexing on four duplex channels by dividing 5 ms time periods into eight timeslots and allocating four slots to upstream communication and four slots to downstream communication. This method is used in PHS (Personal Handy phone System) phones. Other time-division multiplexing schemes may also be used. One example is a scheme in-which 40 ms time periods are divided into six timeslots for each of an upstream and a downstream carrier, and time-division multiplexing performed on six duplexs channels by allocating six slots to upstream communication and six slots to downstream communication (Personal Digital Cellular standard, half-rate). Alternatively, time-division multiplexing may be performed using two upstream and two downstream slots (Personal Digital Cellular standard, full-rate).

The audio processing unit 15 performs processing such as the input/output and amplification of audio signals via the speaker 16 and the microphone 17.

The storage unit 18 is memory such as EEPROM, and stores a phone book table. The phone book table is a list of a plurality of phone book records, each consisting of a registration number, name, telephone number and group number. Each phone book record is entered by the user. FIG. 2 shows an example of a phone book table stored in the storage unit 18. In this example, each line shows the details for one phone book record, and the total number of phone book records stored is 15. The registration numbers in the first column are attached by the control unit 21 in the order that entries are recorded, starting with 001, 002 and so on. The second and third columns store names and telephone numbers, ie. the names of individuals or companies and associated telephone numbers. The column on the extreme right shows group numbers, which are catalog numbers attached by the user classifying the phone book records into groups such as 'business' or 'personal'. In FIG. 2, phone book records are classified using numbers, but simple illustrations and icons may alternatively be used.

Figure 3:
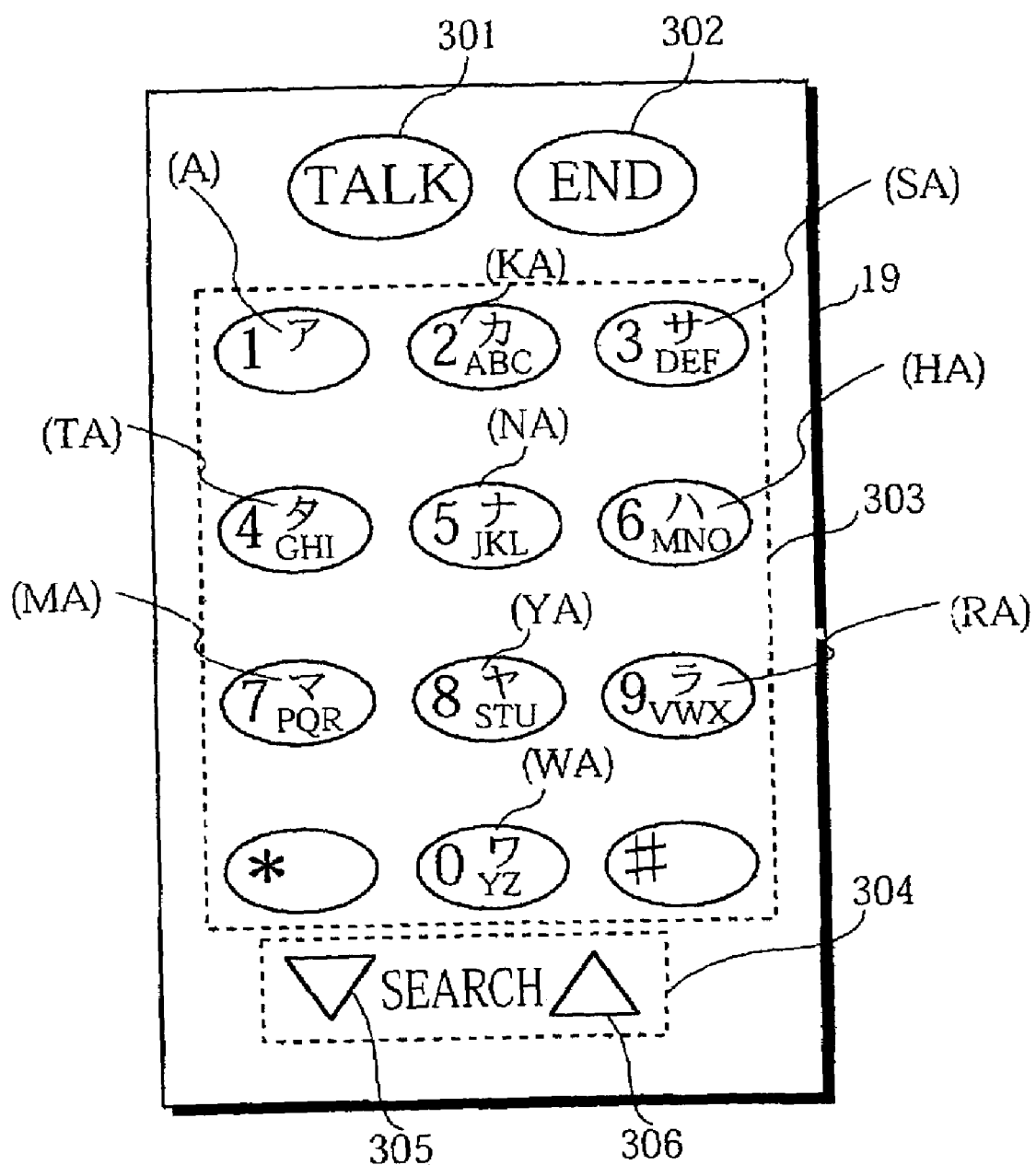
FIG. 3 is an outline drawing of an operating unit.

The operating unit 19 has a plurality of keys used by the user in instructing the control unit 21 to perform a variety of processes, such as searching the phone book table, displaying names, telephone numbers and the like, calling, and making an entry in the phone book table. FIG. 3 is an outline drawing of the operating unit 19. In the drawing, the operating unit 19 includes a talk key 301 for calling, an end key 302 for ending a call or an operation, a numeric keypad 303, and search keypad 304 for displaying a next screen and moving the cursor. The following explanation concentrates on the numeric keypad 303 and the search keypad 304.

The user uses the numeric keypad 303 to enter records into the phone book table and search the phone book table, as well as to input telephone numbers when making calls. As shown in FIG.3, each key in the numeric keypad 303 is assigned certain kana and letters of the alphabet. For example, the kana character 'カ' (ka) and the letters 'ABC' are written on the '2' key, in addition to the number '2'. This indicates that the kana 'カキクケコ' (ka, ki, ku, ke, ko: the characters in the second row of the Japanese syllabic alphabet) and the three letters A, B and C are assigned to this key.

When any one of the numeric keys on the numeric keypad 303 is pressed for at least a specified time (for example two seconds or more), the control unit 21 treats the key operation as a phone book table search instruction. This means that the control unit 21 sets the telephone in phone book mode, performs a search of the phone book table based on the characters or the number assigned to the key being pressed, and displays part of the search result. In the embodiments, a key press of at least the specified time is also referred to as a 'long press' and one shorter than the specified time as a 'short press'.

Alternatively, when a key press is less than the specified time (for example less than 2 s), the control unit 21 treats the key operation as telephone number input when making a call or as input for making an entry into the phone book table.

The search keypad 304 has a next screen key 305, and a cursor move key 306,

In phone book mode, the key 305 is treated as a next screen key rather than a down ($\nabla$) key. This means that when the next screen key 305 is pressed in phone book mode, the key operation is received by the control unit 21 as an operation for switching the display screen of the display unit 20 to a next display screen displaying a further part the search result.

In phone book mode, the key 306 is treated as a cursor move key rather than an up ($\Delta$) key. This means that when the cursor move key 306 is pressed in phone book mode, the key operation is received by the control unit 21 as an operation for shifting a cursor (inverted display line) displayed on the name list down to a next line. In the embodiments, a cursor is a line of the name list whose display has been inverted to indicate that it has been selected by the user.

The display unit 20 is a liquid crystal display panel or similar displaying text and graphics. The display unit 20 displays such items as the name list selected from the phone book table by the control unit 21, telephone numbers, user key input, an antenna strength indicator and a battery level indicator.

Figure 4:
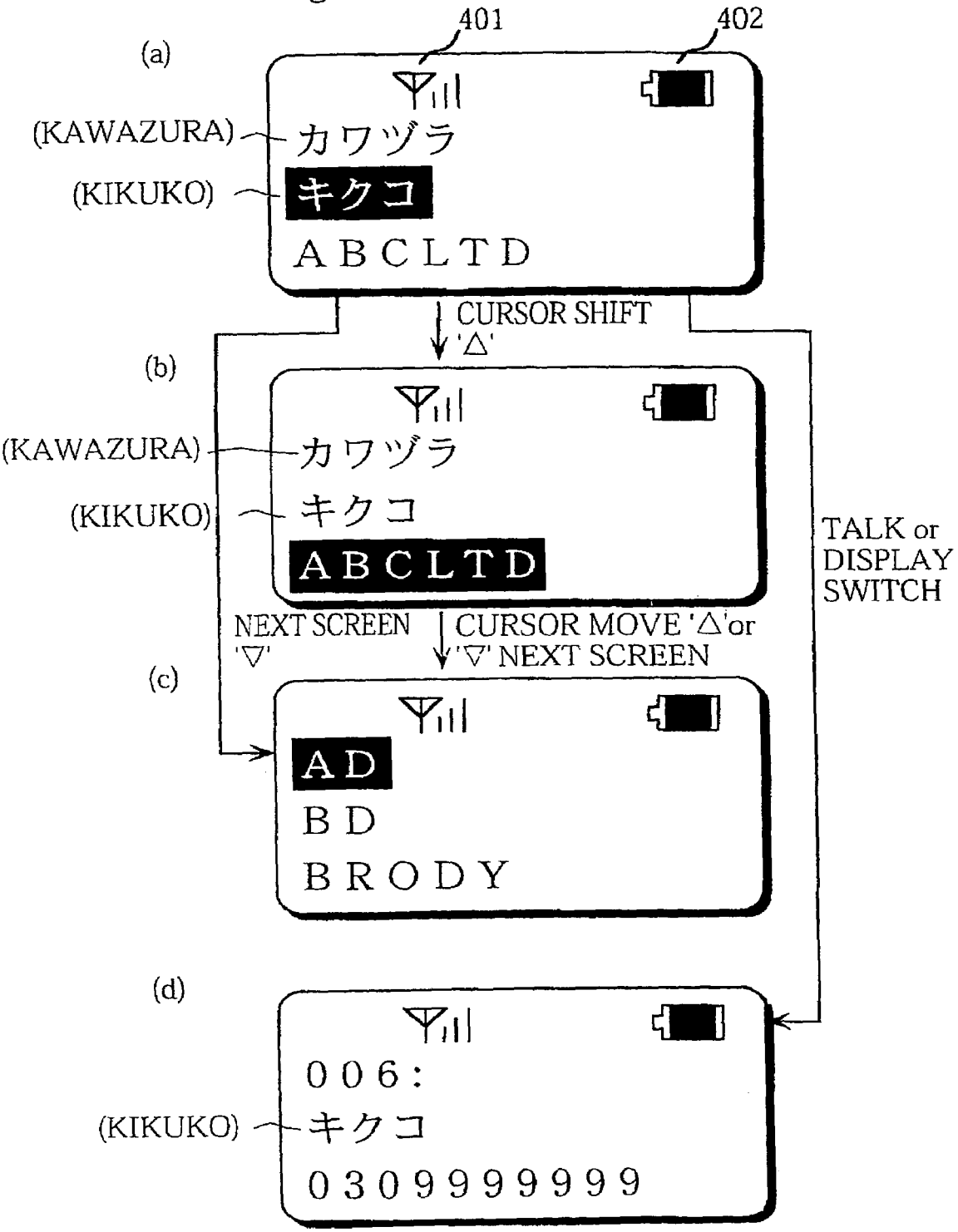
FIGS. 4A to 4D show example display screens for a display panel.

FIGS. 4A to 4D show example display screens of the display unit 20. In FIG. 4A, a numerical reference 401 shows the antenna strength indicator and a numerical reference 402 shows the battery level indicator. A name list 403 selected from the phone book table includes three names. The cursor is placed over the second name, 'キクコ' (Kikuko), so that the characters are displayed inverted. When the cursor is placed over an item in this way, it is described as being in a selection state.

When the user moves the cursor displayed in FIG. 4A to the next line by pressing the cursor move key 306 on the operating unit 19, it is displayed as in FIG. 4B.

The display content of the name list can be switched by pressing the next screen key 305. An example of a display that has been switched to a next screen is shown in FIG. 4C.

If the talk key 301 or a display switch key (not shown) is pressed when the name list is being displayed, the name currently in the selection state is displayed on the display unit 20, along with a corresponding registration number and telephone number. For example, if the talk key 301 is pressed when the screen of FIG. 4A is being displayed, the screen of FIG. 4D is displayed on the display unit 20.

The control unit 21 is formed from a microcomputer with internal ROM and RAM, and controls the telephone by executing various programs stored in ROM.

The control unit 21 receives presses of keys on the operating unit 19 as input. Here, the control unit 21 measures the length of a key press, and performs certain specified processing (explained later in this description) depending on whether the measured key press length is longer than the specified time, in other words on whether the press is a long press or a short press.

The control unit 21 has an internal working memory and flag memory, the former used for sorting and storing phone book records obtained as the search result. The flag memory stores a phone book mode flag M showing whether the telephone is in phone book mode or non-phone book mode, and a search mode flag F showing whether the telephone is in indexed search mode or group search mode. The control unit 21 sets the values of the flags M and F at 0 or 1, depending on the user operation and current status. The flag M is set at 1 in phone book mode, and 0 in non-phone book mode, while the flag F is 0 in indexed search mode and 1 in group search mode. Here, an indexed search conducted in indexed search mode is a search for phone book records made by referring to the initial character of names in the phone book table, and a group search is a search for phone book records made by referring to group numbers in the phone book table.

The control unit 21 primarily performs the following processing:
(1) Search processing
(2) Display processing
(3) Call processing
(4) Standard telephone processing The above processing is performed in response to combinations of the following: the values of the two flags M and F, the length of a key press for a key on the operating unit 19, and the type of key pressed.

The processing of (4) is performed by the control unit 21 when the telephone is in non-phone book mode, that is if a short press is received when the phone book mode flag M is 0. This processing includes processing for standard phone operations, such as recording answerphone messages, inputting telephone numbers, and making calls using input telephone numbers. Explanation of such processing is omitted from the following detailed description of the processing in (1) to (3).

(1) Search Processing

Upon receiving a long press of one of the numeric keys on the numeric keypad 303, the control unit 21, if the current mode is non-phone book mode (M=0), switches to phone book mode (M=1), and searches the phone book table in indexed search mode. If a long press of one of the numeric keys is received when the telephone is already in phone book mode, the control unit 21 searches the phone book table after switching the value of the search mode flag F. This means that search processing is performed after the flag F is switched to either group search mode, if the current search mode is indexed search mode (F=0), or to indexed search mode, if the current search mode is group search mode (F=1).

The following is a detailed explanation of the search processing, using FIG. 5 as an actual example. Note that the phone book table stored in the storage unit 18 is the one in FIG. 2.

If the telephone is in non-phone book mode (M=0), or in group search mode (F=1) when in phone book mode (M=1), the control unit 21, upon receiving a long press of the '2' key on the numeric keypad 303, switches to indexed search mode (F=0) and performs an indexed search. In other words, the control unit 21 searches the phone book table in FIG. 2 for phone book records that start with a character from the 'ka' row of the katakana alphabet (ka, ki, ku, ke, ko) or with A, B and C; in other words for character strings assigned to the '2' key. Then the control unit 21 attaches record numbers to the phone book records in the searched order, and stores them in the working memory. Furthermore, in indexed search mode, the control unit 21 sorts the names in the searched records into alphabetical order for each of the Japanese and Roman alphabets, thereby writing over the content of the working memory so that it appears as in FIG. 5B.

When the telephone is in phone book mode (M=1) and the search mode is the indexed search mode (F=0), the control unit 21, upon receiving a long press of the '1' ke ion the search keypad 303, switches to group search mode (F=1) and performs a group search. This means that the control unit 21 searches the phone book table for phone book records having a group number 1. The control unit 21 attaches record numbers to these records and stores them in the working memory. The content of the working memory at this time is shown in FIG. 5C.

(2) Display Processing

After performing the search processing, the control unit 21 alters the display of the display unit 20 depending on which of the next screen key 305 or the cursor move key 306 is pressed when the telephone is in phone book mode (M=1), as explained below.

After the search processing is completed, the control unit 21 reads the first three phone book records stored in the working memory, that is records 001 to 003, and displays the names from these records on the display unit 20.

When receiving a press of the next screen key 305 in phone book mode, the control unit 21 reads from the working memory the three records directly following those currently displayed and displays the names from the read records on the display unit 20. Suppose that the names from the three records 001 to 003 are currently displayed on the display unit 20. In this case, if the next screen key 305 is pressed, the control unit 21 displays the names from the subsequent records 004 to 006.

When receiving a press of the cursor move key 306 in phone book mode, the control unit 21 moves the cursor one line down from its currently displayed position on the display unit 20. If the cursor is positioned on the third line of the display, it moves to the first line when the cursor move key 306 is pressed.

(3) Call Processing

When receiving a press of the talk key 301 in phone book mode (M=1), the control unit 21 reads a record corresponding to the name currently selected by the cursor from the working memory, and displays the selected registration number, name and telephone number on the display unit 20, while simultaneously using the telephone number to make a call.

Processing Flow for the Control Unit 21

Figure 6:
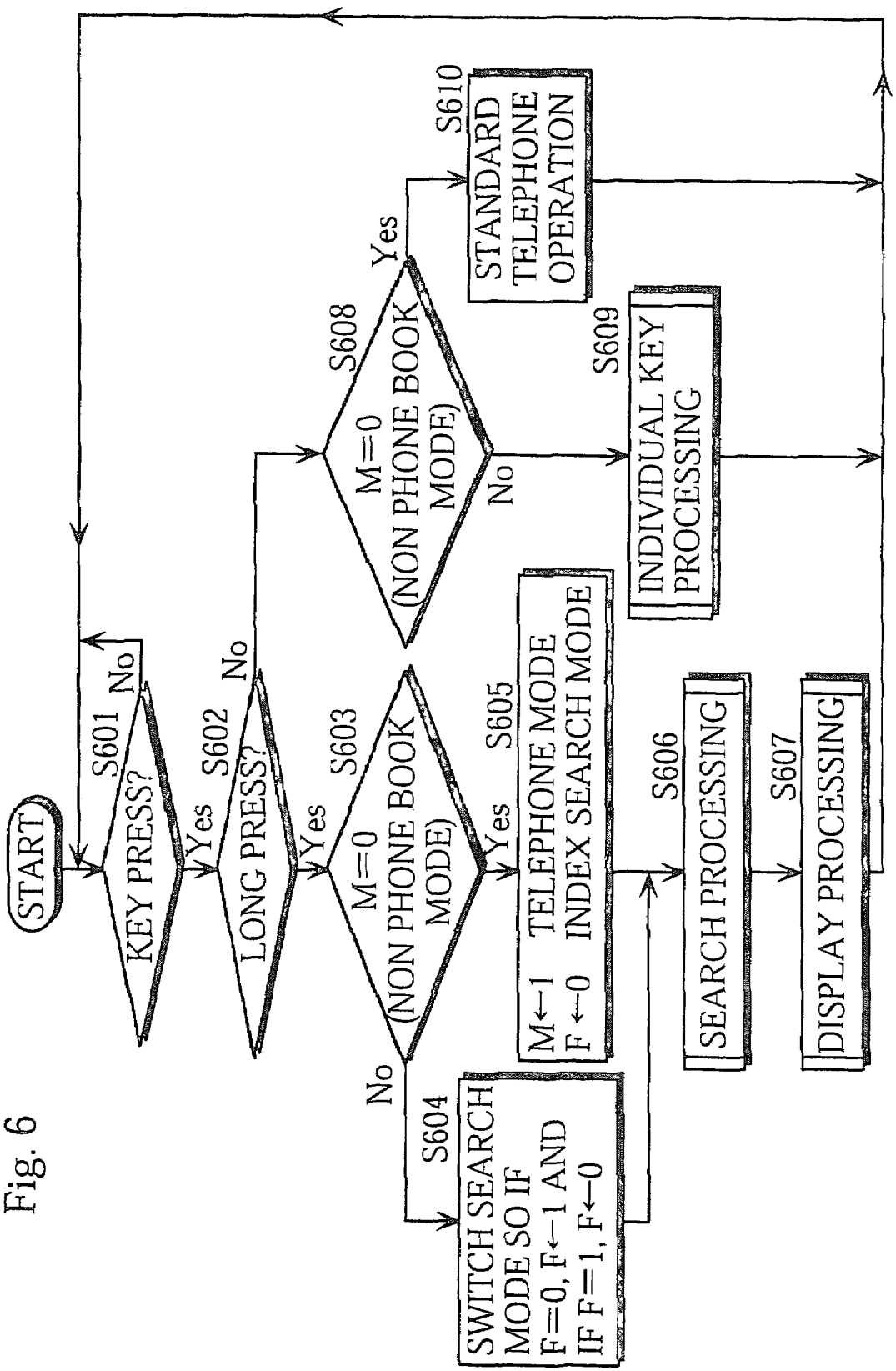
FIG. 6 is a flowchart showing an outline of processing performed by a control unit.

FIG. 6 is a flowchart showing an outline of processing performed by the control unit 21 in response to combinations of the following: the values of the mode flags M and F, the length of time that a key on the operating unit 19 is pressed, and the type of key pressed.

Note that when a key press is generated during the processing shown in the flowcharts of FIGS. 6 to 9, the control unit 21 treats this as an interrupt, branching from the current processing sequence to S601.

Upon receiving a key press from the operating unit 19 (S601), the control unit 21 determines whether this key press is a long press of one of the numeric keys on the numeric keypad 303 (S602). If it is such a long press, the control unit 21 switches or sets the values of the mode flags M and F, depending on their current values (S604, S605). This means that if the phone book mode flag M is 0 (non-phone book mode), the control unit 21 switches the phone book mode flag M to 1 (telephone mode), and sets the search mode flag F at 0 (indexed search mode) (S605). On the other hand, if the phone book mode flag M=1 (phone book mode), the control unit 21 switches the search mode flag F to 1 (group search mode) if the flag is currently set at 0 (indexed search mode) and to 0 (indexed search mode) if it is currently set at 1 (group search mode) (S604).

After switching and setting the values of the mode flags M and F, the control unit 21 performs search processing depending on the values of M and F and the numeric key that is being pressed (S606). The control unit 21 then displays the part of the search result (S607).

When the control unit 21 determines that the key press from the operating unit 19 is not a long press (S602: No) and the phone book mode flag M is 0 (non-phone book mode) (S608: Yes), it performs standard telephone processing (S610).

If the phone book mode flag M is 1 at S608, the control unit 21 performs processing depending on the type of key being pressed (individual key processing) (S609).

The search processing, display processing and individual key processing in the above flowchart are explained below with reference to the flowcharts in FIGS. 6 to 8.

Search Processing Flow for the Control Unit 21

Figure 7:
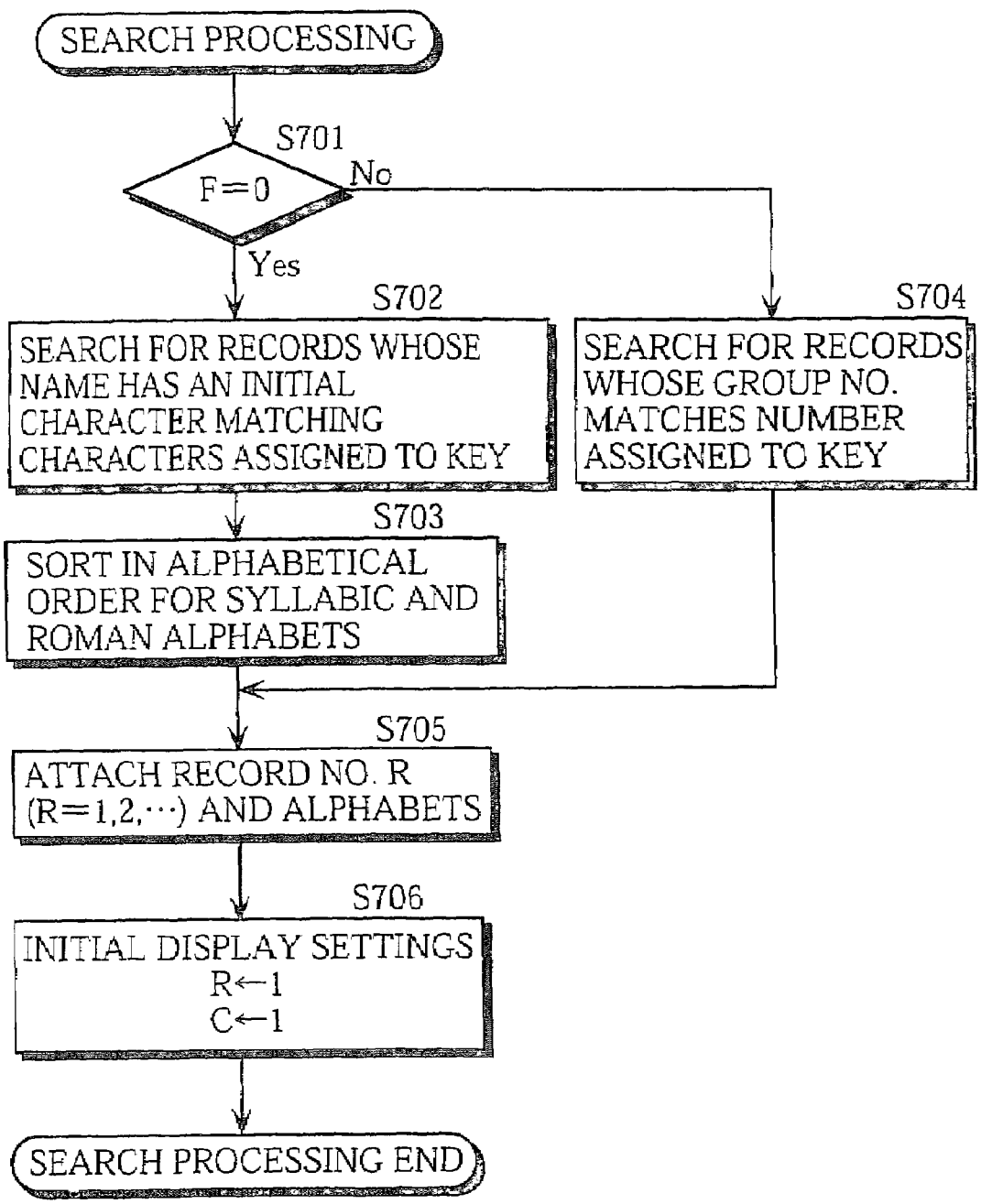
FIG. 7 is a flowchart showing the search processing of FIG. 6.

FIG. 7 is a flowchart showing the search processing in FIG. 6.

The control unit 21 determines from the value of the search mode flag F whether an indexed search or a group search is to be performed (S701).

If the control unit 21 determines that a group search should be performed, it reads, from the phone book table in the storage unit 18, phone book records whose group number matches the number of the key pressed on the numeric keypad 303. The control unit 21 attaches record numbers (R=001, 002 and so on) to the read records and stores them into the working memory (S704, S705).

If the control unit 21 determines that an indexed search should be performed at S701, it reads, from the phone book table stored in the storage unit 18, phone book records with a name whose first character matches the characters assigned to the key pressed on the numeric keypad 303. The control unit 21 then attaches provisional record numbers to the records in the order that they are read from the storage unit 18 and stores them in the working memory (S702).

The control unit further sorts the records in katakana and Roman letters into their respective alphabetical orders, and attaches a record number R to each record (S703, S705).

After processing for the search mode concerned has been performed as described above, the control unit 21 makes initial display settings (S706). This means that variables R and C used in the display processing are set at 1. Here, variable R is a pointer indicating a record number, and variable C is a pointer indicating a cursor position.

Display Processing Flow for the Control Unit 21

Figure 8:
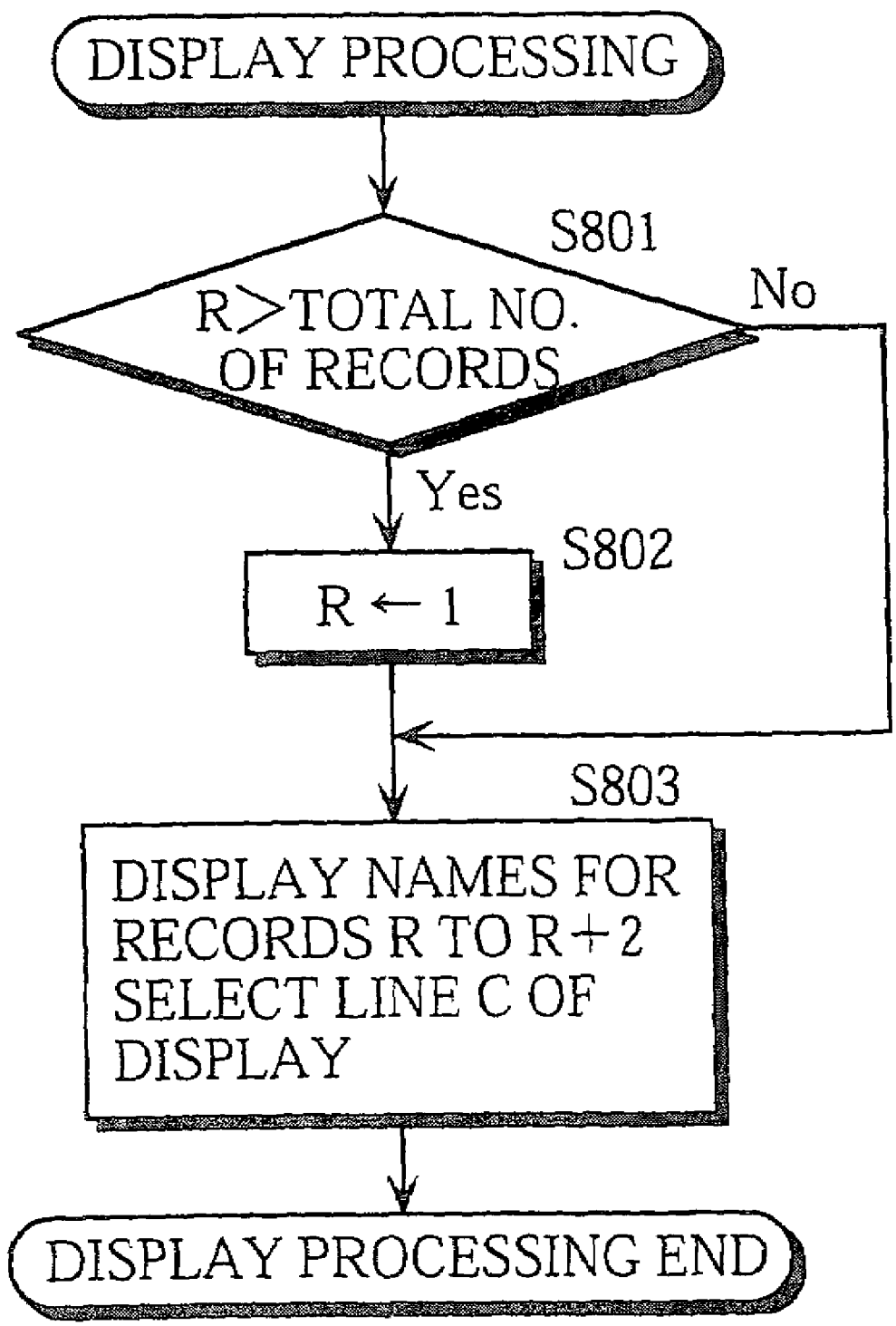
FIG. 8 is a flowchart showing the display processing of FIG. 6.

FIG. 8 is a flowchart showing the display processing of FIG. 6.

The control unit 21 determines whether the value of the variable R exceeds the total number of phone book records (S801). If R does exceed the total number, the control unit 21 sets R at 1 (S802).

The control unit refers to the variable R, reads telephone records with the record numbers R, R+1 and R+2, and displays the names from those records on the display unit 20. Then the control unit 21 refers to the variable C and inverts the line indicated by the variable (cursor display) (S803).

Individual Key Processing Flow for the Control Unit 21

Figure 9:
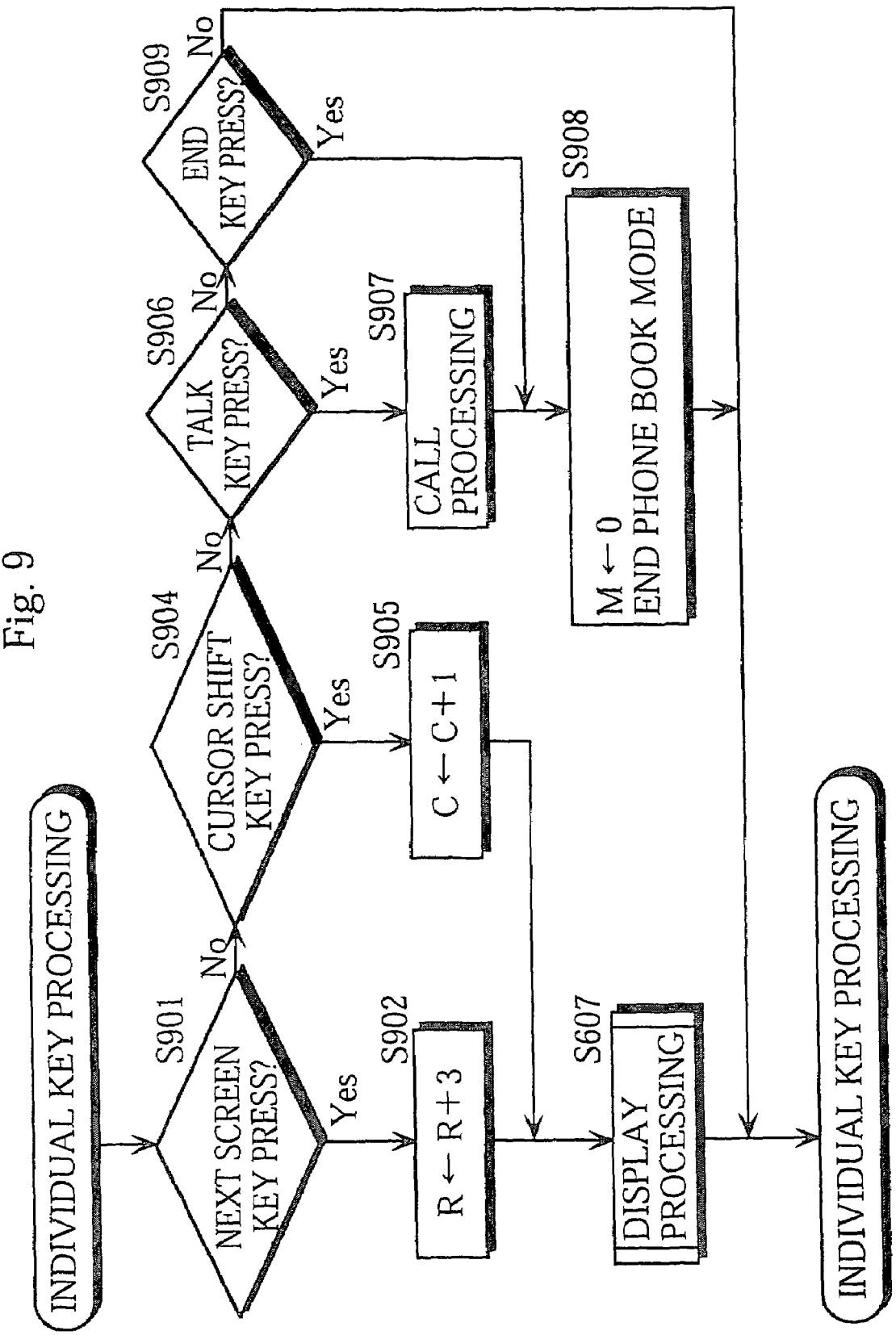
FIG. 9 is a flowchart showing the individual key processing of FIG. 6.

FIG. 9 is a flowchart showing the individual key processing in FIG. 6.

Upon receiving a key press of the next screen key 305 from the operating unit 19 (S901), the control unit 21 adds 3 to the variable R (S902), and then performs the display processing in FIG. 8 (S607). The control unit 21 updates the display of the display unit 20 by referring to this increased value of R.

Upon receiving a press of the cursor move key 306 from the operating unit 19 (S904), the control unit 21 adds 1 to the variable C (S905), and performs display processing in the same way as when the next screen key 305 is pressed (S607). The control unit 21 updates the cursor display on the display unit 20 by referring to this increased value of C. Here the value of C can be 1, 2 or 3. When the result of adding 1 to the value at S905 is 4, the variable C is returned to 1.

Upon receiving a press of the talk key 301 from the operating unit 19 (S906), the control unit 21 reads a telephone number from the record corresponding to the name currently in the selection state, and makes a call using this number (S907). Here, the control unit 21 displays the name on the display unit 20, along with the corresponding registration number and telephone number.

After making a call, the control unit 21 sets the phone book mode flag M at 0 (non-phone book mode), thereby terminating phone book mode (S908).

Upon receiving a press of the end key 302 from the operating unit 19 (S909), the control unit 21 sets the phone book mode flag M at 0 (non-phone book mode), thereby terminating phone book mode (S908).

As the above explanation makes clear, the invention achieves the object of providing a telephone that performs a phone book search using a simple and trouble-free user operation.

Note that this embodiment is described as a construction for a mobile telephone, but the same construction may also be used for a household telephone, a PHS or similar.

In this embodiment, three new records from the working memory in the control unit 21 are displayed when the next screen key 305 is pressed, and the cursor moves to the next line when the cursor move key 306 is pressed, but operations performed when the search keys are pressed need not be limited to these. The following operations may also be performed.

For convenience, the next screen key 305 and the cursor move key 306 will hereafter be referred to as the down key 305 and the up key 306. The content of the working memory in the control unit 21 is that shown in FIG. 10A.

After storing a phone book record group (FIG. 10A) searched from the storage unit 18, the control unit 21 displays names from the records with record numbers 001, 002 and 003. If the down key 305 or up key 306 is then pressed, the control unit 21 determines whether the key press is a long press.

Figure 10:
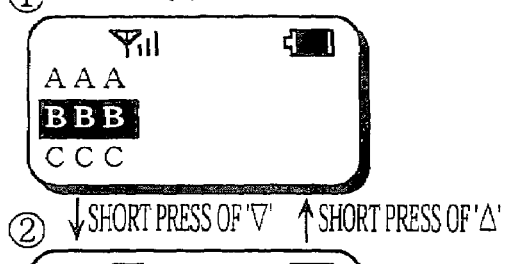
FIG. 10A shows the content of the working memory.
FIG. 10B shows a display screen of a display panel when an up or down key is pressed.
FIG. 10C shows the display screen of the display panel when an up or down key is operated by a long press.
Figure 10:
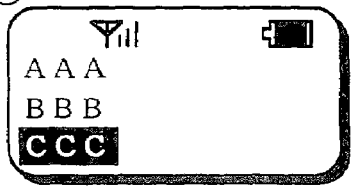
Figure 10:
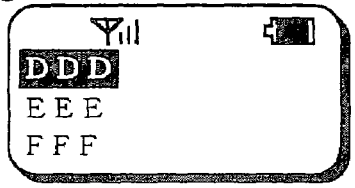
Figure 10:
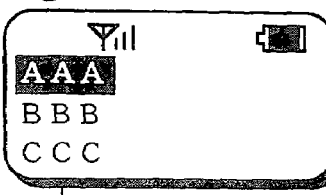
Figure 10:
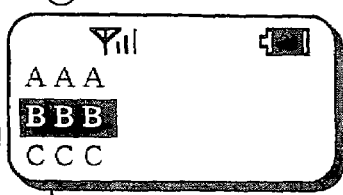
Figure 10:
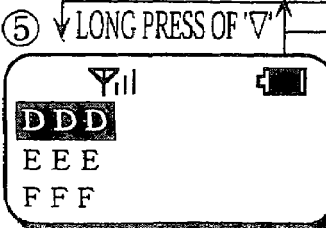
Figure 10:
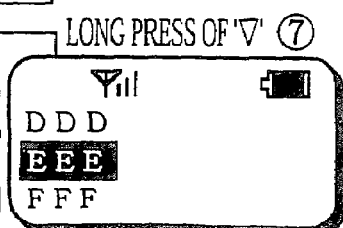

If the key press is not a long press, the control unit 21 moves the cursor as shown in FIG. 10B, so that the cursor is moved one line down (FIG. 10B $\hat{1} \rightarrow \hat{2}$) when the key press is of the down key 305, and one line up ($\hat{2} \rightarrow \hat{1}$) when the key press is of the up key 306. If the cursor is on the third line (FIG. 10B $\hat{2}$) when the control unit 21 receives a press of the down key 305, the control unit 21 deletes the displayed names from the record numbers 001, 002 and 003 from the screen, displays the names from the record numbers 004, 005 and 006, and displays the cursor on the first line (FIG. 10B $\hat{3}$). If the cursor is on the first line when the control unit 21 receives a press of the up key 306, the control unit 21 deletes the displayed names from the record numbers 004, 005 and 006 from the screen, and displays the names from the record numbers 001, 002 and 003, with the cursor displayed on the third line (FIG. 10B $\hat{2}$).

When the key press of the down key 305 or the up key 306 is determined to be a long press, the control unit 21 performs display processing as shown in FIG. 10C. That is, when the key press is of the down key 305, the control unit 21 deletes the displayed names from the record numbers 001, 002 and 003 from the screen, and displays the names from record numbers 004, 005 and 006 (FIG. 10C $\hat{4} \rightarrow \hat{5}$). If the up key 306 is pressed, the control unit 21 deletes the currently displayed names from the display unit 20, and displays names from record numbers lower than those currently displayed. In other words, when names from record numbers 004, 005 and 006 are currently being displayed, the control unit 21 displays names from the record numbers 001, 002 and 003 (FIG. 10C $\hat{5} \rightarrow \hat{4}$).

Here, when a long press is made, the cursor is displayed on the first line of the new display screen, regardless of which line it was displayed on in the previous screen. When for example, the cursor is displayed on the second line, as in FIG. 10C $\hat{6}$, and the down key 305 is pressed, the screen shown in FIG. 10C $\hat{5}$, is displayed, and when the cursor is displayed as in FIG. 10C $\hat{7}$ when the up key 306 is pressed, the screen in FIG. 10C $\hat{5}$ is displayed.

Second Embodiment

Construction of a Mobile Telephone

Figure 11:
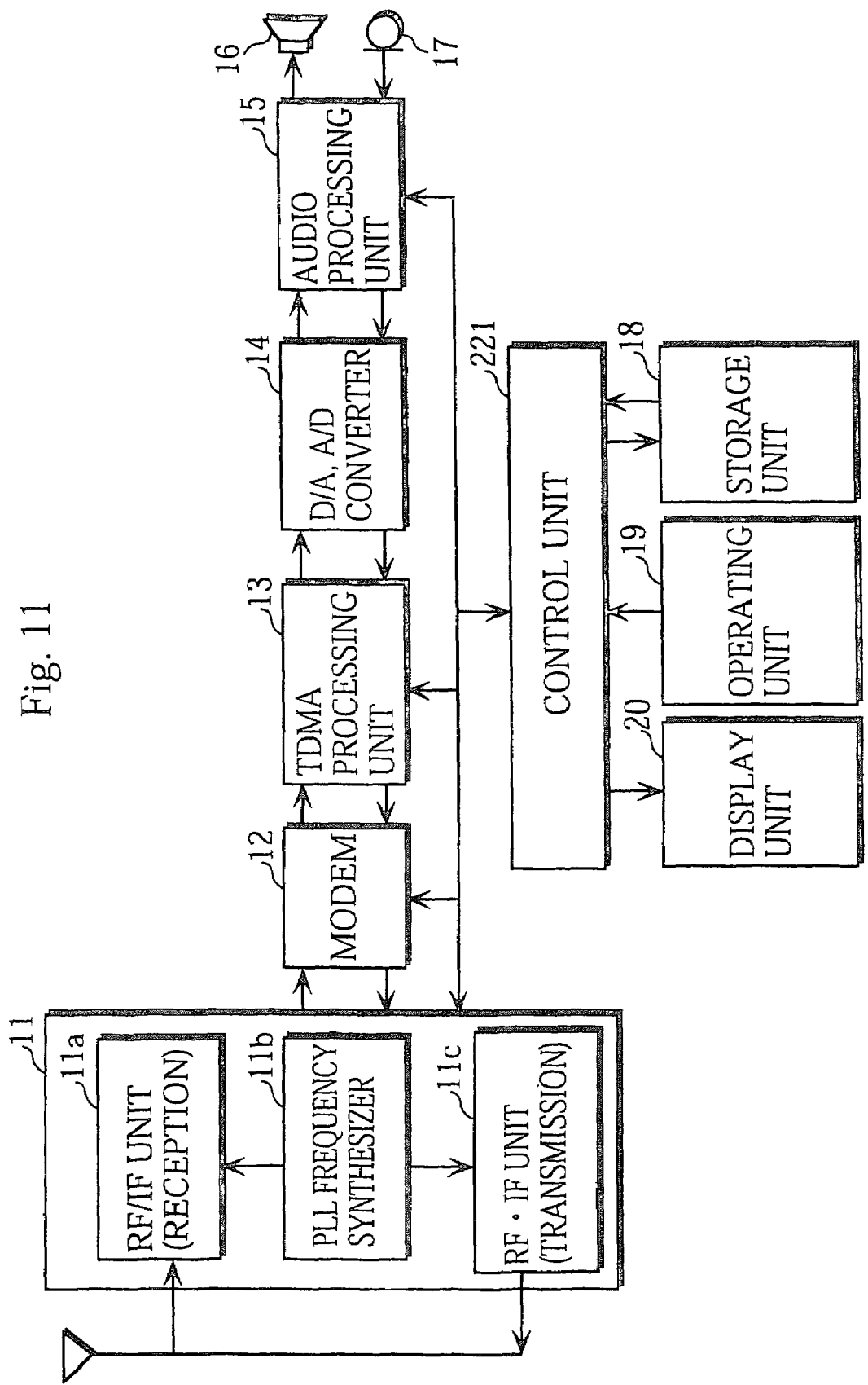
FIG. 11 is a block diagram showing an example construction of a mobile telephone in a second embodiment.

FIG. 11 is a block diagram showing an example construction for a mobile telephone in a second embodiment of the invention.

In FIG. 11, components identical to those in FIG. 1 have the same numerical references. In addition, the phone book table stored in the storage unit 18, shown in FIG. 2, and the outline drawing of the operating unit 19 shown in the FIG. 3, both used in the first embodiment, are the same in this embodiment.

The following explanation omits all characteristics which are identical to FIG. 1, concentrating on those parts unique to this embodiment.

In this embodiment, a control unit 221 is provided instead of the control unit 21 of FIG. 1, and the next screen key 305 and the cursor move key 306 are treated differently by the control unit 221 than they were by the control unit 21 in the first embodiment. For convenience, the keys 305 and 306 are here referred to as the down key 305 and the up key 306.

Furthermore, the numeric keypad 303 is treated the same way by the control unit 221 as in the first embodiment when the telephone is in non-phone book mode, but is treated differently when the telephone is in phone book mode.

When a short key press of the down key 305 is made in phone book mode, the control unit 221 treats this key press as a command for shifting the cursor down to a next line of the displayed name list.

When a short press of the up key 306 is made in phone book mode, the control unit 221 treats this key press as a command for shifting the cursor up to a previous line of the displayed name list.

When a previously pressed key on the numeric keypad 303 receives a short press when in phone book mode, the control unit 221 treats this key press as a command for shifting the cursor down to a next line of the displayed name list. In other words, a short press of a previously-pressed numeric key performs the same function as a press of the down key 305.

FIG. 12A to 12D show examples of display screens on the display unit 20 updated using these key operations.

Figure 12:
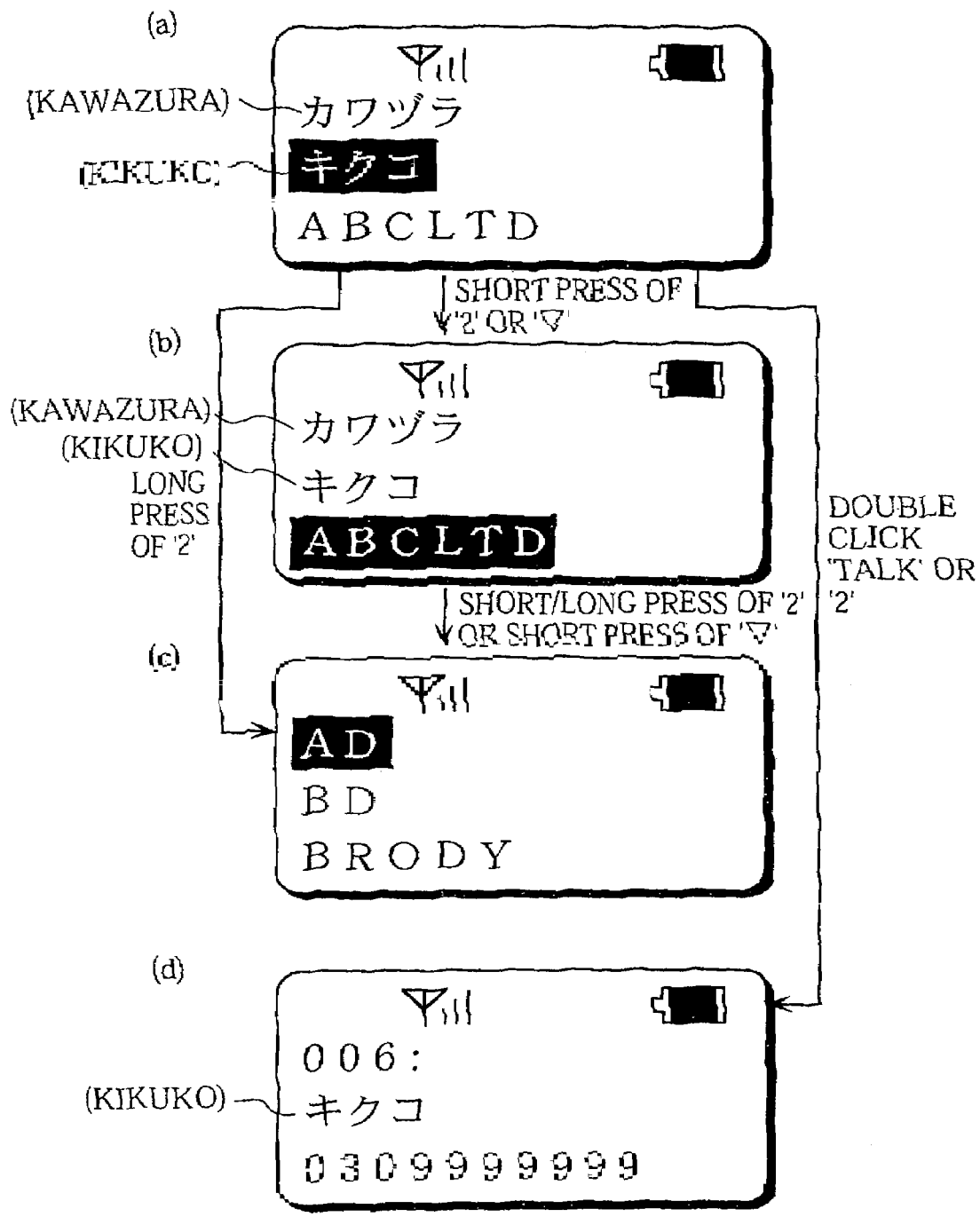
FIGS. 12A to 12D show example display screens for a display panel updated by key operations.

FIG. 12A shows a situation when the user has made a long press of the numeric key '2', putting the telephone into phone book mode, and performing an indexed search. The cursor is currently positioned over the second name 'キクコ' (Kikuko) in the name list.

If a short key press is then made of the same key that was pressed for the long press (in this case the '2' key), the cursor is shifted down to the next line, and places the next name in the search result, 'ABC Ltd', in the selection state, as shown in FIG. 12B.

Suppose another short key press of the same key (i.e. the '2' key) is made. Here, the next line of the search result 'AD' is not currently displayed, so the display is updated to display the next three records, and 'AD' is placed in the selection state. In this case, the display screen is scrolled down three lines (the number of lines that can be displayed on the screen).

Note that pressing the down key 305, rather than the '2' key as shown in FIGS. 12A and 12B, would update the display in the same way.

The control unit 221 has a working memory and performs the search processing (1), call processing (3) and standard telephone processing (4), in the same way as the control unit 21 in the first embodiment, but the display processing (2) differs from the first embodiment.

The following is an explanation of the display processing (2).

Following search processing, the control unit 221 reads the first three phone book records stored in the working memory, in other words records 001 to 003, and displays the names corresponding to these records.

When another short press is made of the same numeric key that initiated the search for the currently displayed results, the control unit 221 moves the cursor down one line from its current display position. Here, if the cursor is already positioned on the lowest line (the third line) of the screen, the display is updated to the next three records from the search result, and the cursor moved to the first line.

Outline Processing Flow for the Control Unit 221

Figure 13:
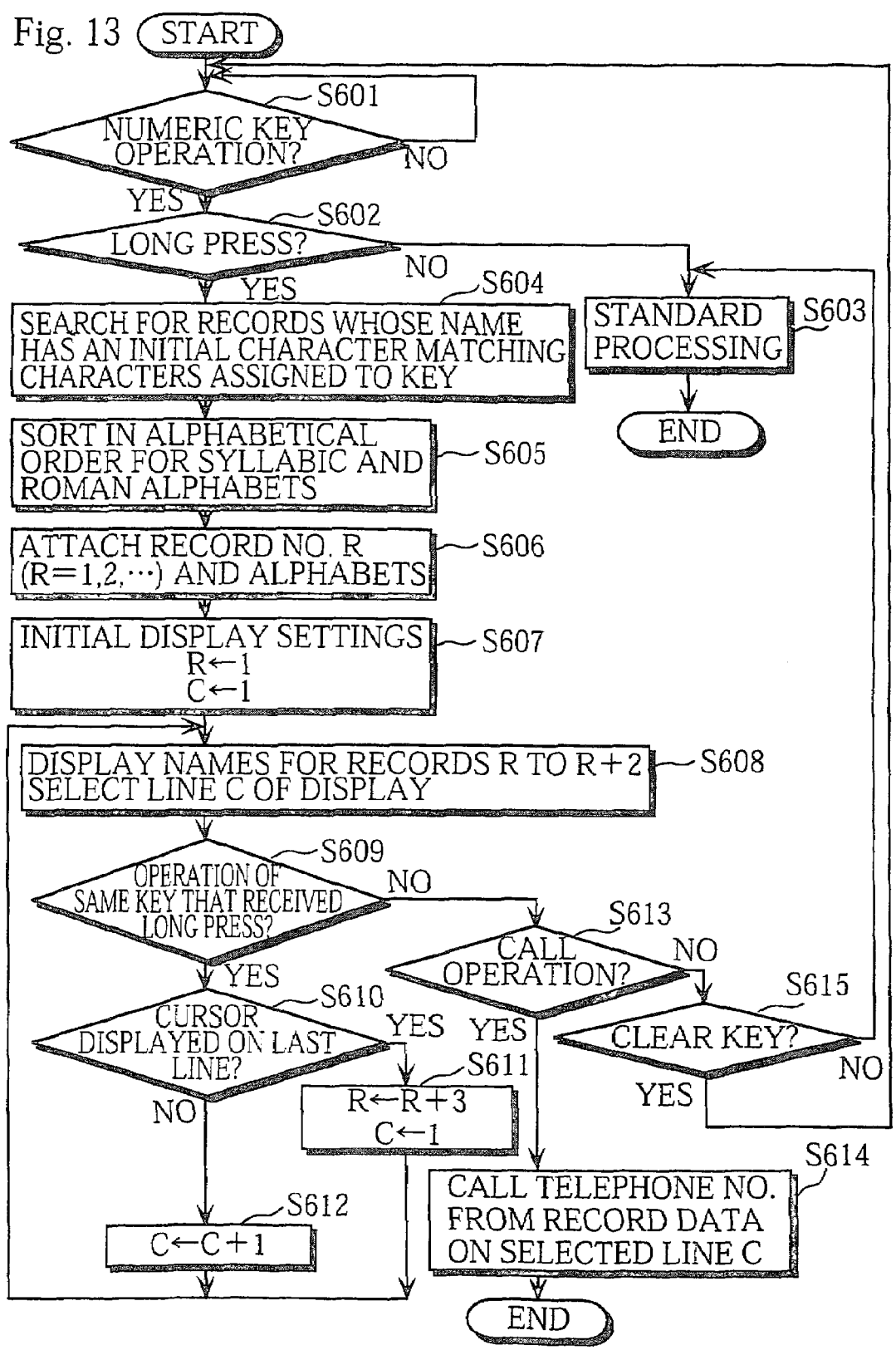
FIG. 13 is a flowchart showing the processing content for an operation performed by the control unit depending on length of key press and type of key.

FIG. 13 is a flowchart showing the content of processing performed by the control unit 221 depending on the length of a key press and the type of key pressed.

The control unit 221 detects a key press via an interrupt generated when the key is pressed, and determines whether the detected key press is of one of the keys in the numeric keypad 303 (S601). If one of the keys in the numeric keypad 303 has been pressed, the control unit 221 determines whether the press is long or short (S602).

If the press is determined to be a long press, the control unit 221 reads, from the phone book table, phone book records having a name whose initial character matches the characters assigned to the pressed numeric key. The control unit 221 then attaches provisional record numbers to the records in the order in which they are read, and stores them in the working memory (S604).

The control unit 221 further sorts the phone book records stored in the working memory into a predetermined order (alphabetically in terms of both the syllabic and Roman alphabets) and attaches record numbers R to the records from the start of the alphabetically arranged list (S605).

Following this, the control unit 221 makes initial display settings (S606). In other words, it sets variables R and C used for display at 1. Here, the variable R is a pointer indicating a record number, and the variable C is a pointer indicating a cursor position.

Next, the control unit 221 performs the following display processing.

The control unit 221 refers to the variable R, reads phone book records with the record numbers R, R+1 and R+2, and displays the names from the records on the display unit 20. Here, the number of phone book records read is determined according to the number of display lines on display unit 20. If there are four display lines, for example, four phone book records are read.

The control unit 221 further refers to the variable C, and uses the cursor to select the name on the line indicated by the value of C (S608).

Following this, the control unit 221 determines whether a pressed key is the same key on which the long press was made (S609), and if the same key has been pressed, moves the cursor down one line. Here, the control unit 221 determines whether the cursor is currently positioned on the last line of the display unit 20 (S610). If the cursor is positioned on the last line, the control unit 221 increases the variable R by the number of display lines (here three) and returns the variable C to 1. This enables the next three lines of the search result to be displayed (S611). If the cursor is not positioned on the last line, the control unit 221 increases the variable C by 1 (S612). Then the control unit 221 returns to S608 and updates the display content. This kind of cursor movement can be performed in the same way when the down key 305 is operated, but it is more effective to operate the same key twice in succession.

Having displayed the desired phone book entry and selected it by shifting the cursor, the user presses the talk key 301 with the desired entry still in the selection state, thereby making a call. The control unit 221 detects that a call operation has been made (S609, S613), reads the record data for the selected line represented by the variable C and makes a call (S614).

Furthermore, should the operated key be a clear key (not shown), the display is cleared and the control unit 221 returns to S601 (S615). If the operated key is not the clear key, the control unit 221 shifts to call mode or setting mode, and receives standard processing commands (S603).

As the above explanation makes clear, the mobile telephone in this embodiment enables the user to search the phone book using a simple and speedy and trouble-free operation.

This embodiment refers to the construction of a mobile telephone, but may also be applied to the construction of a household telephone, a PHS or similar.

Third Embodiment

The following is an explanation of a third embodiment, a mobile telephone in which a function for updating the display at high speed using a long press is included in the display processing.

In the second embodiment, when a key on which a long press was previously made is operated again, the cursor is shifted without determining whether this second key operation is a long press or a short key press, as is shown in S609 of FIG. 13. In this embodiment, however, the control unit 221 controls processing so that the display is scrolled if the second key operation is a long press and the cursor moved if the second key operation is a short key press.

Figure 14:
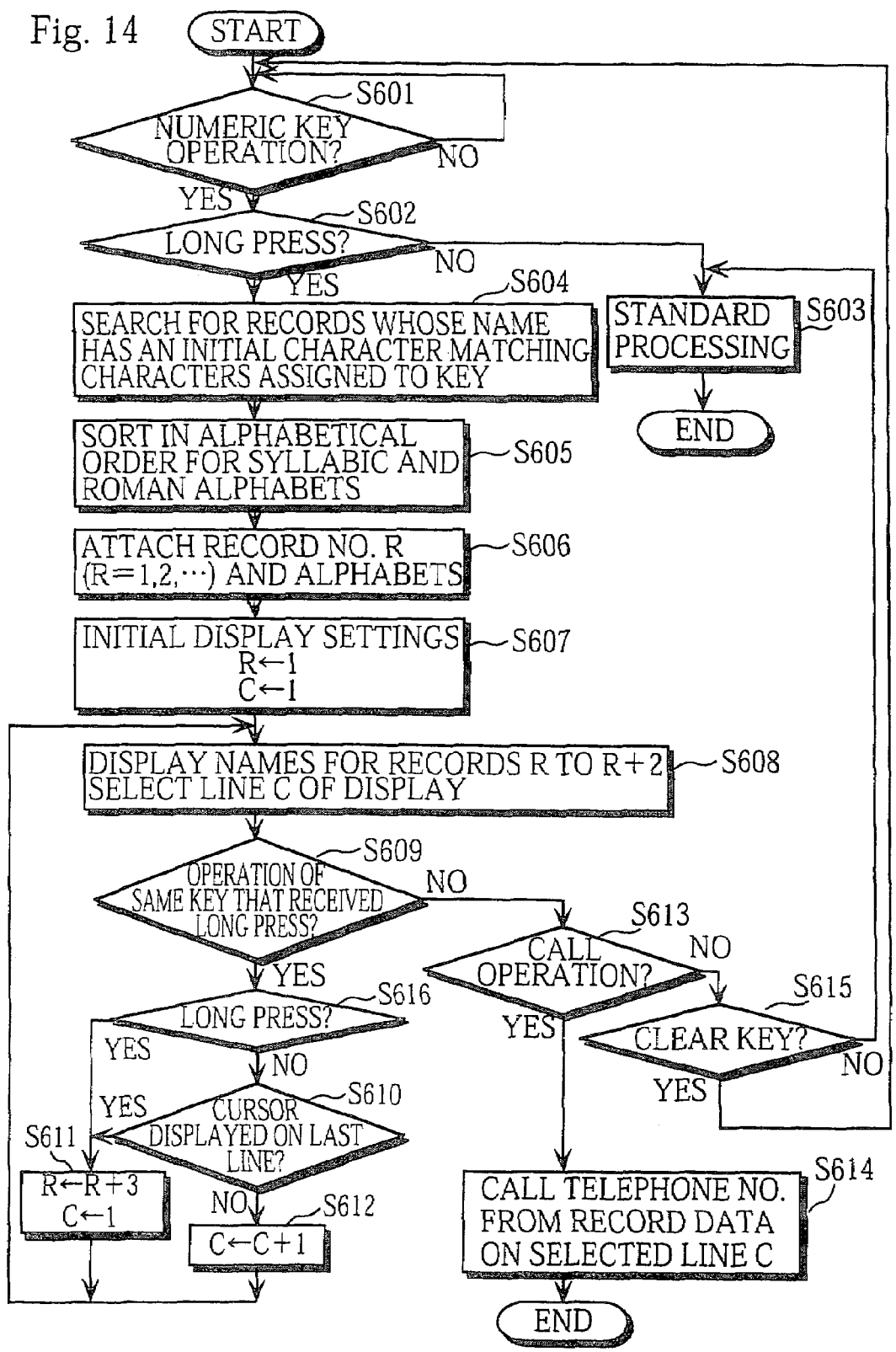
FIG. 14 is a flowchart showing the processing content of an operation performed by a control unit 221 in a third embodiment.

FIG. 14 is a flowchart showing the processing content performed by the control unit 221 in this embodiment. In the drawing, steps identical to those shown in FIG. 13 are given the same numerical references. Explanation of these steps is omitted from the following description, which concentrates on those steps unique to this embodiment.

Steps S609 onwards are unique to this embodiment, and so the following description explains those steps.

The control unit 221 determines whether the operated key is the same as that operated for a previous long press (S609). If the same key is operated, the control unit 221 then determines whether the operation is a long or short press (S616). If the key operation is a long press, the control unit 221 increases the variable R (the pointer indicating phone book records) by 3, and returns the variable C (the pointer indicating the cursor position) to 1. This enables the next three records from the search result to be displayed (S611). Then, the control unit 221 returns to S608, and updates the display; i.e. shows the next three records from the search result.

Meanwhile, if the key operation is a short (standard) key press rather than a long press, the control unit 221 moves the cursor display position, selecting the next line down. In this processing, the control unit 221 first determines whether the current cursor display position (C) is on the last line of the display unit 20 (in the case of this embodiment whether C=3) (S610). If the cursor is on the last line (C=3), the control unit 221 increases the value of R by the equivalent of one display screen (in these embodiments by 3) and returns the cursor display position to 1 (C=1). This enables subsequent records to be displayed (S611).

If the cursor is not on the last line, the control unit 221 increases the value C indicating the cursor display position by 1, enabling the cursor display position to be shifted without scrolling down the screen (S612). Then, the control unit 221 returns to S608 and repeats the same processing. This enables the cursor display position to be shifted down the entries listed in the search result one line at a time. Shifting the cursor down the search result in this way can also be performed by operating the down key 305, but successively operating the same key enables a more efficient search to be performed.

During display processing, as explained above, the control unit 221 scrolls the display when a same key is operated using two successive long presses, and moves the cursor when a same key is operated using successive long and short key presses. This enables the user to perform a high-speed search simply by pressing the same numeric key twice in succession.

Fourth Embodiment

A mobile telephone further capable of performing call operations by pressing a key that was previously operated using a long press is explained in a fourth embodiment.

Figure 15:
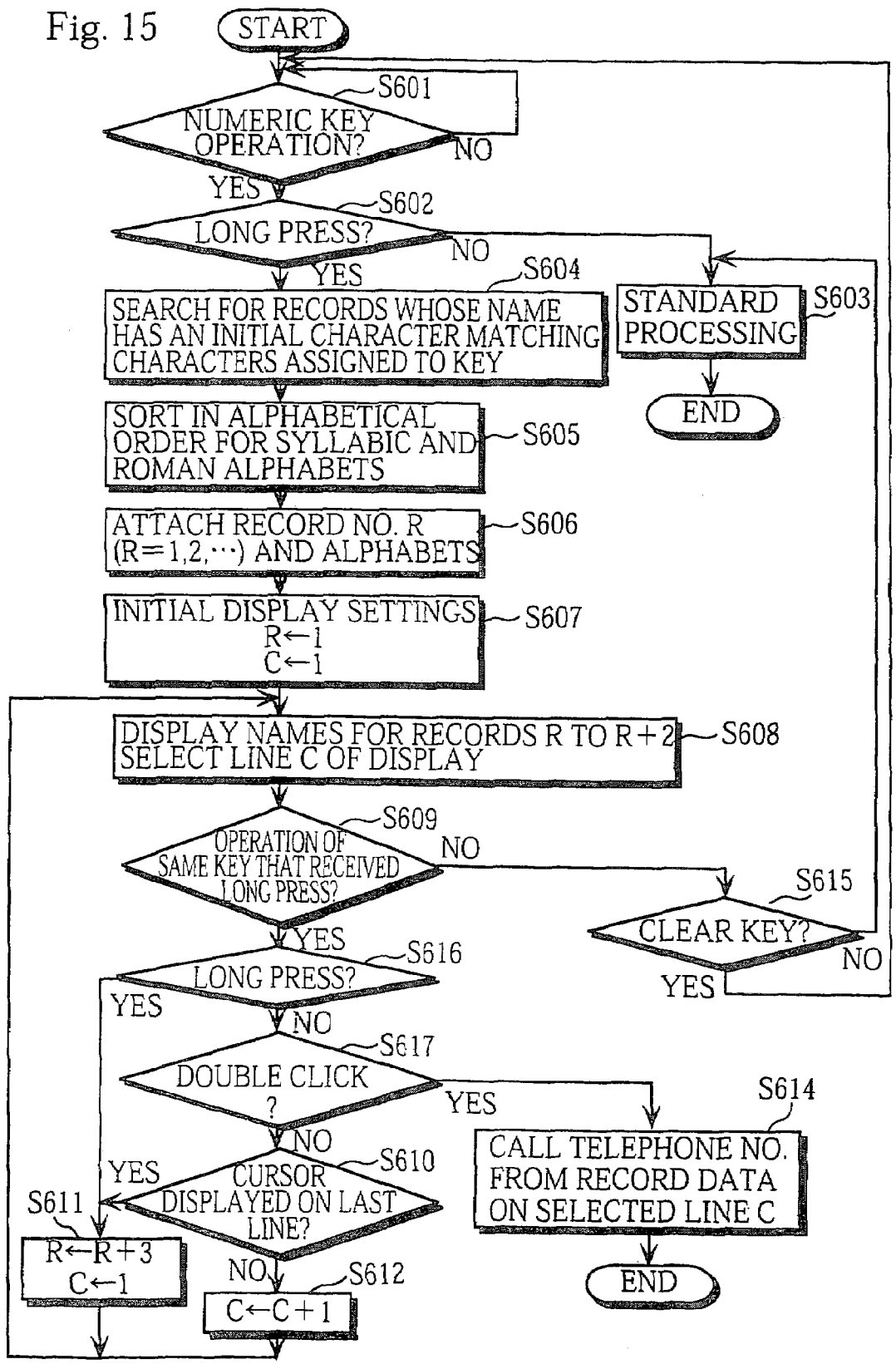
FIG. 15 is a flowchart showing the processing content of an operation performed by the control unit 221 in a fourth embodiment.

FIG. 15 is a flowchart showing the processing content for the control unit 221 relating to this embodiment. In the flowchart, steps having the same processing content as steps in FIGS. 13 and 14 have the same numerical references. Explanation of these steps is omitted here, and the following description concentrates on those points unique to this embodiment. As a result, the explanation of FIG. 15 begins at S609.

The control unit 221 determines whether the operated key is the same as that operated for a previously long press (S609) If the same key is operated, the control unit determines whether the key operation is a long press (S616). If the key operation is a long press, the control unit 221 increases R by the equivalent of one display screen (in this embodiment 3), and returns the cursor display position to 1. This enables the next three records from the search result to be displayed (S611). Then, the control unit 221 returns to S608. Repetition of this procedure enables a high-speed search to be performed.

Meanwhile, if the key operation is not a long press, the control unit 221 determines whether the key has been pressed twice within a designated time (a so-called 'double click') (S617). If the key operation is determined to be a double click, the control unit 221 treats this as a call command, shifts to S614 and performs the call processing of S614.

If the key operation is not a double click, but a standard key operation, i.e. a short key press, the control unit 221 moves the selected cursor position to the next line down.

As explained above, the user may instruct the telephone to perform call processing by double-clicking a numeric key rather than pressing the talk key 301. Thus, the user can switch the telephone to phone book mode and perform a range of operations, from shifting a cursor to making a call, simply by operating the same numeric key using a long press followed by one of a short press, another long press or a double click.

INDUSTRIAL APPLICABILITY

The telephone in the present embodiment has a storage unit storing names and associated telephone numbers in a phone book, and an operating unit including a plurality of numeric keys, each key being assigned different characters. When a numeric key on the operating unit is pressed for at least a designated time, the telephone searches the storage unit for names including the characters assigned to that numeric key, and displays the names on a display unit. This enables the telephone to include a phone book search that may be performed using a simple user operation as part of its phone book function.

What is claimed is:

1. A telephone comprising:

a storage unit for storing names to be called and corresponding telephone numbers;

an operating unit, including a plurality of numeric keys that are each assigned different characters, for receiving key operations made by a user;

a judgment means for, when a numeric key on the operation unit is pressed, judging whether the press continues for at least a predetermined time;

a searching means for, when the judgment means has judged affirmatively, searching the storage unit for names, in accordance with a character assigned to the pressed numeric key;

a display means for performing display based on a search result; and an accepting means for, when the judgment means has judged negatively, accepting a number assigned to the pressed numeric key as an input of a telephone number, wherein the display means:

(1) displays a predetermined number of names from the names found by the searching means, one of the displayed names in a selection state, the name in the selection state being displayed differently to other names;

(2) places another name that is currently being displayed into the selection state, when the operating unit receives a selection changing operation; and (3) displays, when the operation unit receives an operation different from the selection changing operation, other names than the displayed names, and places one of the other names on display into the selected state, the one of the other names being displayed differently to other names.

* * * * *